(12) United States Patent
Lavine et al.

(10) Patent No.: US 7,647,076 B1
(45) Date of Patent: Jan. 12, 2010

(54) DISPLAYING CUSTOMIZED IMAGES ON A WIRELESS DEVICE

(75) Inventors: Adam Lavine, Livermore, CA (US); Yu-Jen Dennis Chen, Livermore, CA (US)

(73) Assignee: Funmobility, Inc., Pleasanton, CA (US)

( * ) Notice: Subject to any disclaimer, the term of this patent is extended or adjusted under 35 U.S.C. 154(b) by 730 days.

(21) Appl. No.: 11/271,542

(22) Filed: Nov. 11, 2005

Related U.S. Application Data

(60) Provisional application No. 60/627,602, filed on Nov. 12, 2004.

(51) Int. Cl.
*H04M 1/00* (2006.01)

(52) U.S. Cl. ............... 455/566; 455/158.4; 455/158.5; 455/418; 348/177; 348/333.01; 345/428

(58) Field of Classification Search ........... 455/566, 455/158.4, 158.5, 418; 348/177, 333.01, 348/333.05; 345/428, 149
See application file for complete search history.

(56) References Cited

U.S. PATENT DOCUMENTS

| | | | |
|---|---|---|---|
| 5,727,129 A * | 3/1998 | Barrett et al. ............. 706/10 |
| 6,304,909 B1 * | 10/2001 | Mullaly et al. ........... 709/232 |
| 6,412,008 B1 * | 6/2002 | Fields et al. ............. 709/228 |
| 6,950,198 B1 * | 9/2005 | Berarducci et al. ....... 358/1.12 |
| 7,054,637 B2 * | 5/2006 | Weigand .................. 455/445 |
| 7,154,621 B2 * | 12/2006 | Rodriguez et al. ........ 358/1.15 |
| 7,206,757 B2 * | 4/2007 | Seigel et al. .............. 705/26 |
| 7,239,871 B2 * | 7/2007 | Shamp et al. ............ 455/422.1 |
| 2001/0054029 A1 * | 12/2001 | Williams .................. 705/52 |
| 2002/0138843 A1 * | 9/2002 | Samaan et al. ............. 725/87 |
| 2002/0186402 A1 * | 12/2002 | Jackson et al. ........... 358/1.15 |
| 2003/0023755 A1 * | 1/2003 | Harris et al. ............. 709/246 |
| 2005/0076327 A1 * | 4/2005 | Helal et al. .............. 717/100 |
| 2006/0046696 A1 * | 3/2006 | Knowles et al. .......... 455/412.1 |
| 2006/0139371 A1 * | 6/2006 | Lavine et al. ............. 345/620 |
| 2006/0246872 A1 * | 11/2006 | Tarkkala ................. 455/411 |
| 2007/0088627 A1 * | 4/2007 | Elson et al. ............... 705/27 |
| 2007/0111726 A1 * | 5/2007 | Lambert et al. .......... 455/432.1 |
| 2007/0180406 A1 * | 8/2007 | Hanechak ................ 715/837 |
| 2007/0207782 A1 * | 9/2007 | Tran ...................... 455/414.1 |
| 2007/0243904 A1 * | 10/2007 | Chin et al. ............... 455/566 |
| 2007/0265923 A1 * | 11/2007 | Krassner et al. ........... 705/14 |
| 2007/0268121 A1 * | 11/2007 | Vasefi et al. .............. 340/506 |
| 2007/0288543 A1 * | 12/2007 | Evans et al. .............. 709/200 |
| 2008/0214147 A1 * | 9/2008 | Kim et al. ............... 455/414.1 |
| 2008/0261569 A1 * | 10/2008 | Britt et al. ............... 455/414.1 |
| 2008/0288983 A1 * | 11/2008 | Johnson et al. ............ 725/46 |

* cited by examiner

*Primary Examiner*—Minh D Dao
(74) *Attorney, Agent, or Firm*—Workman Nydegger

(57) ABSTRACT

Customizing an image for display on a wireless device. A user accesses an image database and selects an image to customize. After the user selects an image, the image is retrieved from the image database based on a profile of the device. A customized image is produced from a composite of the selected image and a text layer generated from user text provided by a user. The customized image is formatted for the user's device based on the device profile and then transmitted to the user's device for display.

24 Claims, 2 Drawing Sheets

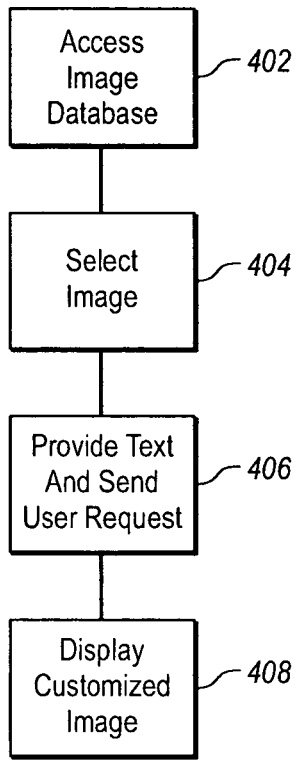
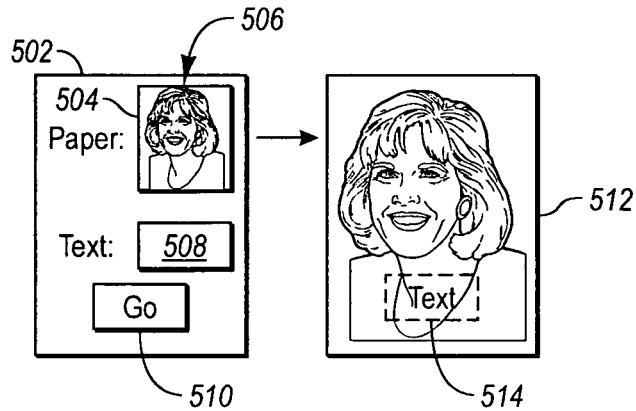
Fig. 5
Fig. 4
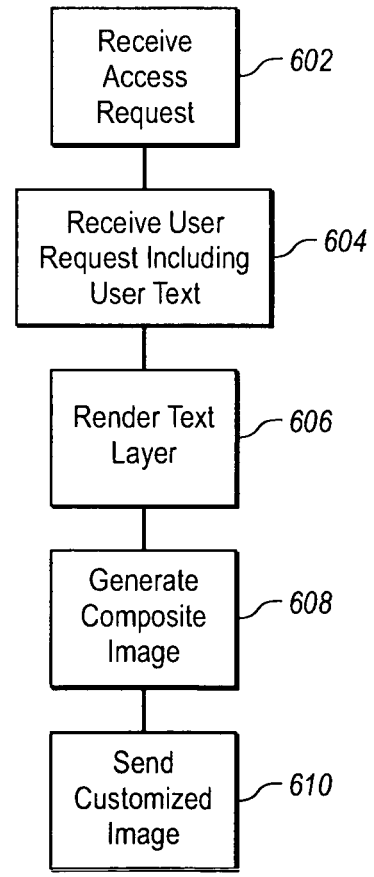
Fig. 6

DISPLAYING CUSTOMIZED IMAGES ON A WIRELESS DEVICE

CROSS REFERENCE TO RELATED APPLICATIONS

This application claims the benefit of U.S. Provisional Application Ser. No. 60/627,602 filed Nov. 12, 2004, which is hereby incorporated by reference in its entirety.

BACKGROUND OF THE INVENTION

1. The Field of the Invention

The invention generally relates to systems and methods for displaying images on a mobile or wireless device. More particularly, embodiments of the invention relate to systems and methods for displaying customized wallpaper on a mobile telephone.

2. Description of the Related Art

Advances in technology have resulted in a proliferation of electronic devices. Cellular telephones, for example, have become an integral part of people's lives. Cellular telephones, and other wireless devices, improve each year and today, cellular telephones with large, colorful displays can be easily obtained.

The ability to display colorful images has led people to customize the screens of their own devices. Many people, for example, put an image known as a wallpaper on the display of their cellular telephone. Wallpaper images are thus displayed on the screen and provide a background scene to the user.

Displaying an image on a cellular telephone is not a simple task for several reasons. For example, cellular telephones are made in a wide variety of models by many different manufacturers. As a result, different models tend to have display screens of different sizes, color capabilities, image format, and resolutions. Simply downloading a wallpaper image to a cellular telephone is not likely to result in a properly displayed wallpaper image. The wallpaper image may not fit properly on the display of the cellular telephone, for example. In addition, the image may be distorted to fill the entire display and result in an unsatisfactory wallpaper image. Alternatively, the image may leave portions of the screen that are not filled.

The problems associated with wallpaper images are further complicated when a user desires to customize the wallpaper images. Allowing a user to type in text that is simply displayed with the wallpaper image does not produce a professional result. There is no guarantee, for example, that the text is placed in the best location on the wallpaper image. Further, the text may not look as if it is part of the image. Instead, the text often looks as though someone pasted the text on top of the image. There is therefore a need in the art for improved customization of images.

SUMMARY OF SEVERAL EXAMPLE EMBODIMENTS

A method for customizing an image for display on a device is disclosed. The method can include receiving a user request for a customized image, the user request including an image selection and a device profile. The method can further include retrieving a particular image from an image database based on the device profile. The method can further include receiving user text. The method can further include rendering a text layer that includes the user text with one or more effect parameters applied to the user text. The method can further include producing the customized image from the text layer and the particular image from the image database. The method can further include sending the customized image to the device.

A method for customizing a display of a device with a wallpaper image is disclosed. The method can include accessing an image database. The method can further include selecting a particular image from the image database. The method can further include providing user text to customize the particular image. The method can further include sending a user request to a server, the user request including the particular image, the user text, and a profile of the device. The method can further include receiving a customized image from the server, wherein the server produced the customized image from a composite of the user text and the particular image.

These and other objects and features of the present invention will become more fully apparent from the following description and appended claims, or may be learned by the practice of the invention as set forth hereinafter

BRIEF DESCRIPTION OF THE DRAWINGS

In order that the manner in which advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 4 is an example flow diagram for customizing an image from a device's perspective;

FIG. 5 illustrates examples of a user interface for customizing an image; and FIG. 6 is an example flow diagram for customizing an image from a server's perspective.

DETAILED DESCRIPTION OF SEVERAL EMBODIMENTS

Embodiments disclosed herein relate to systems and methods for customizing images that can be displayed on an electronic device. Several embodiments enable users to provide text that can be incorporated into a wallpaper image. Several embodiments can also enable users to provide text that is rendered with a wallpaper image and then properly displayed on the user's device.

Figure 1:
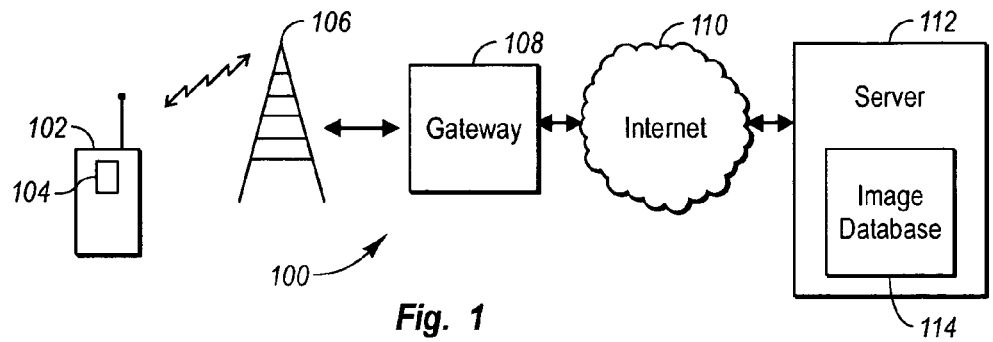
FIG. 1 illustrates an example environment for implementing embodiments of the invention.

FIG. 1 illustrates an example environment for implementing embodiments of the invention. FIG. 1 illustrates a device 102 that has a display 104 where images such as wallpaper images can be displayed. The device 102 communicates with a remote server 112 to access an image database 114 from which a wallpaper image is selected. Several embodiments enable wallpaper images in the image database 114 to be customized with text provided by a user of the device 102 and displayed on the display 104.

In FIG. 1, the device is a cellular telephone in wireless communication with a tower 106 that communicates with a gateway 108. The gateway 108 serves as a bridge between the protocols of the wireless network in which the device 102 operates and other networks such as the Internet 110. The gateway 108 thus converts a transmission in one domain to another or from one protocol to another. In this example, the device 102 is transmitting over a wireless network using protocols that are common to cellular telephones. The gateway 108 receives the transmission from the device 102 and forwards the transmission over the Internet 110 to the server 112 using the appropriate Internet protocol. Similarly, the gateway 108 converts data transmitted over the Internet 110 from the server 112 into the appropriate wireless protocol for transmission to the device 102. Using this type of example environment, the device 102 can request and received wallpaper images from the image database 114 of the server 112.

Figure 2:
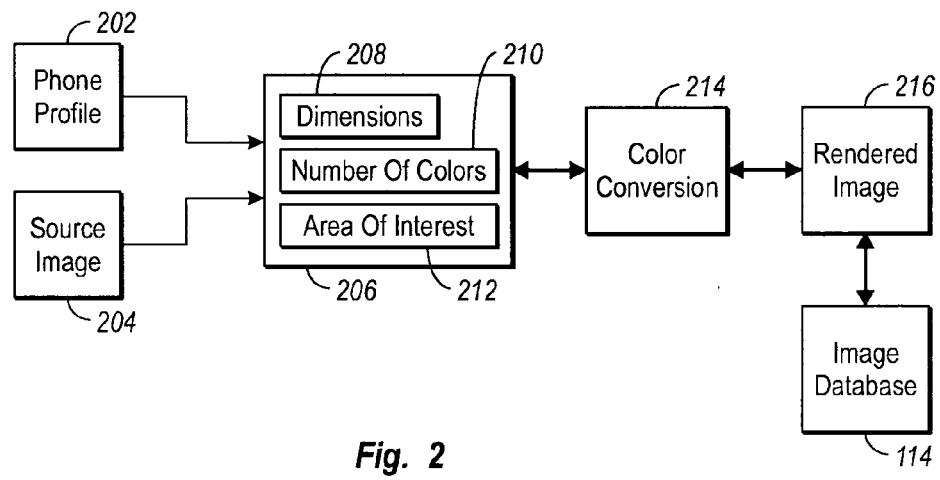
FIG. 2 illustrates an embodiment for producing an image database that includes images adapted to different displays.

As previously stated, devices such as cellular telephones often have displays of varying sizes, color capabilities, and resolutions. Referring to FIG. 2, a block diagram is shown illustrating an embodiment for preparing wallpaper images in the image database to accommodate the various displays of different devices that may download a wallpaper image. The image database 114 stores images that have been pre-processed in anticipation of being downloaded to a remote device. In other words, for a given source image 204, the image database 114 may contain multiple versions of the source image 204 to accommodate the various display dimensions, color capabilities, and/or resolutions associated with various devices.

Thus, the process of generating the image database 114 typically begins with the source image 204 and a set of phone profiles 202. Parameters 206 are then used to process the source image 204. Examples of parameters from the phone profile 202 can include the dimensions of the display 208, the number of colors of the display 210, the resolution of the display, and the like or any combination thereof.

Some of the parameters 206 can also be derived or associated with the source image 204. Because the displays of devices are different, each source image 204 can have an area of interest 212. The area of interest 212 can be an area of an image that should be displayed. This area of interest 212 can be expanded to accommodate various display types. Examples of methods for scaling, cropping, or otherwise adapting an image so that the area of interest is appropriately displayed on a display of a wireless device are disclosed in U.S. Provisional Patent Application Ser. No. 60/640,354, entitled "Cropping of Images for Display on Variably Sized Display Devices" filed on Dec. 29, 2004, the contents of which are expressly incorporated herein by reference.

The source image 204 is then processed using these parameters 206. The source image 204 may be quantized to work with fewer colors (e.g. 8-bit color). In this case, a color conversion 214 is performed (e.g. 32 bit to 8 bit color) to produce the rendered image 216 that is stored in the image database 114.

A source image 204 is typically processed in this manner for each phone profile. One advantage gained by generating an image database with wallpaper images that are specific to particular phone profiles is that a user experiences less wait time when downloading a customized image.

Figure 3:
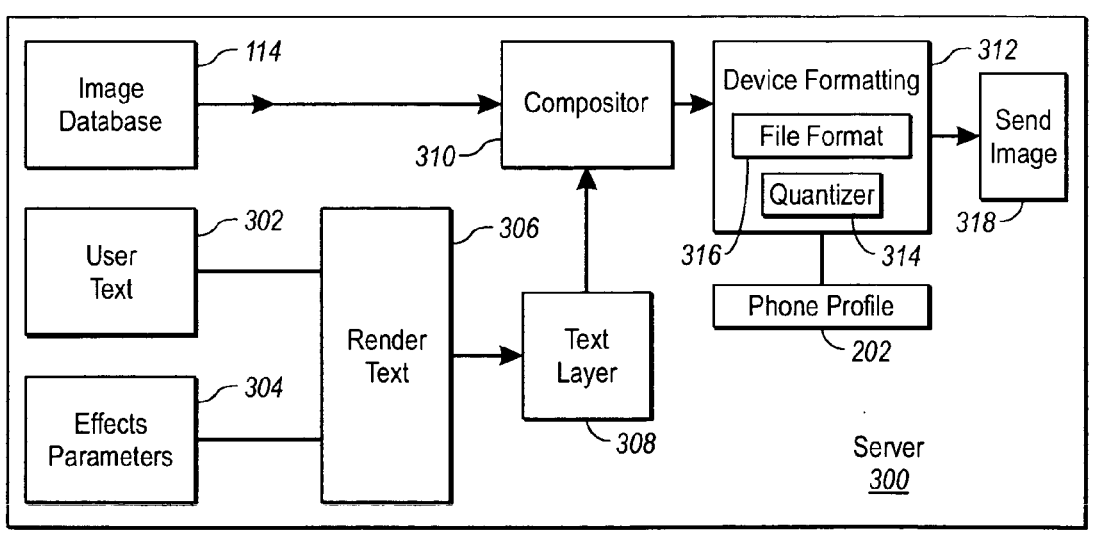
FIG. 3 illustrates an embodiment of a server that generates a customized image using an image from the image database and user text.

FIG. 3 illustrates a server that generates and sends a wallpaper image to a user. The image database 114 includes rendered images as described above. When the server receives a user request to download or view the wallpaper images, the user request typically includes an identifier that enables the server 300 to identify the phone profile of the user's device. Using this information, the appropriate version of a source image can be selected from the images in the image database 114.

The user request can also include user text 302 with which the server 300 customizes the selected image. The user text 302 can be processed with effects parameters 304 to render text 306 into a text layer 308. The effects parameters 304 may include, by way of example and not limitation, color of the text, whether a shadow is used, a size of the text, and/or a position of the text in the selected image. Many of the effects parameters can be pre-determined for the user. In another embodiment, the user may be able to select the parameters used to generate the text layer 308.

After the text layer 308 is generated, a compositor 310 composites the text layer 308 with the selected image. The compositor 310 inserts the text layer 308 with the selected image. The customized image is then device formatted 312 for the requesting device. This final act of device formatting 312 typically uses the phone profile 202 to put the customized image into the appropriate format 316 as well as quantize the customized image, for example, based on the color capabilities of the requesting device. Finally, the server sends the customized image 318 to the requesting device, which displays the customized image as a wallpaper image.

FIG. 4 illustrates an example method for customizing a wallpaper image for a device such as a cellular telephone from the perspective of the user's device. Using a device, a user accesses an image database 402. The image database may be organized by theme or other manner such that a user can quickly focus on potential wallpaper images of interest. An image can be selected for customization 404. Selecting an image for customization 404 can be done by scrolling through small thumbnail images displayed to the user. After the user selects an image, text is provided and the user request is sent 406 to the remote server. The user request can include the selected image, the text, and a phone profile or identifier. Finally, the device receives the customized image and displays the customized image 408 on the screen of the device.

FIG. 5 further illustrates a method of customizing a wallpaper image. More particularly, FIG. 5 illustrates examples of a user interface at a device for customizing a wallpaper image. After a user has selected a directory or category of images, a thumbnail image 504 is displayed to a user in the user interface 502. The user can scroll 506 to view other thumbnail images from the selected category as well or to select another category of images.

After an image is selected, the user can input text 508 into the user interface 502. After the go button 510 is selected, the server is provided information that represents a profile of the user's phone, the selected image, and the text. As described previously, the server then produces a composite image that includes the user text. The server next formats the customized image and transmits it to the device. The user interface 512 illustrates a wallpaper image displayed to the user. The text 514 has been incorporated into the image. The customized image is configured specifically for the user's device and customization request.

FIG. 6 illustrates an example method for customizing a wallpaper image from the perspective of the server. The server first receives a request 602 from the user to access a particular category of images from the image database. The server then sends thumbnail images for the user's review from the selected category. After the user selects an image, the server receives a user request that includes the user text 604 and identifies the selected image. The server then renders a text layer 606 and generates a composite image 608. After formatting the image for the user's device, the server sends the customized image 610 to the requesting device.

The processes, methods of use and examples of components listed in the invention are illustrative and not inclusive.

The invention may be embodied in other specific forms without departing from its spirit or essential characteristics. The described embodiments are to be considered in all respects only as illustrative and not restrictive. The appended claims are presented to illustrate the embodiments of the invention disclosed herein.

What is claimed is:

1. A method for customizing an image for display on a device, the method comprising:
   receiving a user request from a device at a server computer for a customized image to be displayed on the device, the user request including user text, an image selection and a device profile, wherein the user text is received into the device from a user;
   retrieving a particular image from an image database stored on the server computer based on both the image selection and the device profile;
   rendering, by the server computer, a text layer that includes the user text received in the user request;
   compositing, by the server computer, the text layer and the particular image to produce the customized image for the device; and
   sending the customized image to the device configured to display the customized image on a display.

2. A method according to claim 1, further comprising applying one or more effects parameters to the text layer, wherein the one or more effects parameters includes one or more of:
   color of the text;
   a shadowing of the text;
   a text size; and
   a position of the text within the particular image.

3. A method according to claim 2, wherein the one or more effects parameters are predetermined for the user or are selectable by the user.

4. A method according to claim 1, further comprising position the text within the particular image based on an area of interest of the particular image.

5. A method according to claim 1, wherein the device profile includes one or more of:
   a display dimension;
   a number of display colors;
   a cellular phone profile;
   a display resolution; and
   a cellular phone identification.

6. A method according to claim 1, further comprising sending a plurality of low-resolution thumbnail images to the device, each thumbnail image depicting at least a portion of multiple images of different configurations stored in the image database.

7. A method according to claim 1, wherein the image selection received corresponds to multiple images stored in the image database, wherein each of the multiple images on is configured for display according to a different device profile.

8. A method according to claim 7, wherein the multiple images corresponding to the image selection have been created from a single image by taking into account an area of interest in the single image when the multiple images are created from the single image.

9. A method according to claim 1, wherein the device comprises a cellular phone with a display and the device profile includes display parameters of the cellular phone.

10. A method according to claim 1, wherein the user request and user text are received from a cellular phone via a network, the network including a wireless communication link and the Internet.

11. A method for customizing a display of a device with a wallpaper image, the method comprising:
   accessing an image database stored on a server, wherein the image database stores a plurality of images for customization;
   selecting a particular image from the image database;
   providing user text from a user of the device to customize the particular image with the user text;
   sending a user request to the server, the user request including a selection of the particular image, the user text, and a profile of the device;
   receiving a customized image from the server, wherein the server composites the user text and the particular image to generate the customized image; and
   displaying the customized image on a display of the device.

12. A method according to claim 11, wherein the user request further includes a selection of one or more text effects parameters for compositing the user text with the particular image.

13. A method according to claim 12, wherein the one or more text effects parameters includes one or more of:
   color of the text;
   a shadowing of the text;
   a text size; and
   a position of the text in the particular image.

14. A method according to claim 13, wherein the position of the text is based on an area of interest of the particular image.

15. A method according to claim 11, wherein the device profile includes at least one or more of:
   a display dimension;
   a number of display colors;
   a cellular phone display profile;
   a display resolution; and
   a cellular phone identification.

16. A method according to claim 11, further comprising receiving a plurality of low-resolution thumbnail images from the image database.

17. A method according to claim 16, wherein:
   each thumbnail image received corresponds to multiple images stored in the image database;
   each of the multiple images corresponding to the image selection is configured for display by a different device profile; and
   the particular image is selected by selecting one of the thumbnail images and by providing the profile of the device.

18. A method according to claim 17, wherein the multiple images corresponding to the image selection have been created from a single image by taking into account an area of interest in the single image when the multiple images are created from the single image.

19. A method according to claim 11, wherein the device comprises a cellular phone with a display and the device profile includes display parameters of the cellular phone.

20. A method according to claim 11, wherein the image database is stored at the location of a server and the image database is accessed over a network.

21. A method according to claim 20, wherein the network includes a wireless communication link and the Internet.

22. A method for producing an image database that includes images adapted to different displays, the method comprising:
   retrieving a source image;
   retrieving a set of device profiles from a server computer, the device profiles including parameters, the parameters of each device including at least one of:

a display dimension;

a number of display colors;

a display resolution; and a device identification;

processing the source image with the server computer according to the set of device profiles to create a set of custom images from the source image, each custom image corresponding to a different device profile; and storing the set of custom images in a computer-readable medium in the server computer; and providing a particular image from the set of custom images stored in the server computer in response to a user request that includes a particular device profile used to generate the particular image.

23. A method according to claim 22, wherein the source image includes an area of interest, the method further comprising:

processing the source image according to the area of interest and the set of device profiles when the set of custom images are created, wherein each image in the set of custom images includes the area of interest.

24. A method according to claim 22 further comprising:

creating a low-resolution thumbnail image from the source image; and storing the low-resolution thumbnail image in the computer-readable medium; and associating the thumbnail with the source image and with the set of custom images.

* * * * *

UNITED STATES PATENT AND TRADEMARK OFFICE
CERTIFICATE OF CORRECTION

PATENT NO. : 7,647,076 B1  Page 1 of 1
APPLICATION NO. : 11/271542
DATED : January 12, 2010
INVENTOR(S) : Lavine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1067 days.

Signed and Sealed this

Sixteenth Day of November, 2010

David J. Kappos
*Director of the United States Patent and Trademark Office*